(12) United States Patent
Choi

(10) Patent No.: US 7,747,215 B2
(45) Date of Patent: Jun. 29, 2010

(54) APPARATUS AND METHOD FOR EDITING A RECEIVED VIDEO AND AUDIO SIGNAL IN A MOBILE TERMINAL

(75) Inventor: Young-Jin Choi, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 1139 days.

(21) Appl. No.: 11/236,109

(22) Filed: Sep. 26, 2005

(65) Prior Publication Data

US 2006/0079175 A1     Apr. 13, 2006

(30) Foreign Application Priority Data

Sep. 25, 2004   (KR)   ................. 10-2004-0077639

(51) Int. Cl.
*H04H 40/18* (2008.01)
(52) U.S. Cl. ..................... 455/3.06; 455/3.04
(58) Field of Classification Search ........ None
See application file for complete search history.

(56) References Cited

U.S. PATENT DOCUMENTS

| 5,886,275 | A | * | 3/1999 | Kato et al. ............ 84/609 |
| 6,404,978 | B1 | | 6/2002 | Abe |
| 2004/0071446 | A1 | * | 4/2004 | Yagi et al. ............ 386/98 |

FOREIGN PATENT DOCUMENTS

| EP | 0 536 959 A2 | 4/1993 |
| EP | 0 536 959 A3 | 4/1993 |
| EP | 0 940 985 A2 | 9/1999 |
| EP | 1 418 579 A2 | 5/2004 |
| JP | 06-295567 | 10/1994 |
| JP | 08-289203 | 11/1996 |
| JP | 2003-078863 | 3/2003 |
| JP | 2003-101898 | 4/2003 |
| KR | 1020010037513 | 5/2001 |
| WO | WO 03/001772 A2 | 1/2003 |

OTHER PUBLICATIONS

Michael Kanellos, Samsung, "Arrival of a Protable Phone Capable of Receiving Satellite Television Broadcast This Autumn", [Online], May 18, 2004. URL, http://japan.cnet.com/news/tech/story/0.2000056025,20066983.00.htm CNET News.com May 18, 2004 08:37.

* cited by examiner

*Primary Examiner*—Philip J Sobutka
(74) *Attorney, Agent, or Firm*—Lee, Hong, Degerman, Kang & Waimey

(57) ABSTRACT

The present invention relates to a broadcast editing apparatus and method for editing a satellite broadcast signal in a mobile terminal of a wireless communication system. A satellite broadcast signal received from a satellite or a gap filter is divided into a video signal and an audio signal. An inputted user's voice or sound effect is either multiplexed with the separated video signal or integrated with the separated audio signal. The integrated audio signal and the separated video signal may be multiplexed to edit a satellite broadcast. The edited satellite broadcast may be stored to be reproduced at anytime by the user. Accordingly, the user can edit and appreciate the satellite broadcast according to his preference. Also, an audio signal may be transmitted to another person by being inserted into a satellite broadcast through a multimedia message service.

9 Claims, 3 Drawing Sheets

APPARATUS AND METHOD FOR EDITING A RECEIVED VIDEO AND AUDIO SIGNAL IN A MOBILE TERMINAL

CROSS-REFERENCE TO RELATED APPLICATIONS

Pursuant to 35 U.S.C. §119(a), this application claims the benefit of earlier filing date and right of priority to Korean Application No. 2004-77639, filed on Sep. 25, 2004, the contents of which is hereby incorporated by reference herein in its entirety.

FIELD OF THE INVENTION

The present invention relates to a mobile communication terminal, and more particularly, to a broadcast editing apparatus and method capable of editing a satellite broadcast signal in a mobile terminal of a wireless communication system.

BACKGROUND OF THE INVENTION

A digital multimedia broadcast (DMB) is a broadcast service for providing various multimedia signals to a portable receiver, a receiver for a vehicle and the like, by modulating the multimedia signals into digital signals. The digital multimedia broadcast is based on the integration a digital audio broadcast (DAB), which is a technique used for a digital radio, and the concept of a multimedia broadcast. Accordingly, data information such as moving images, weather, news and location may be provided In order to provide the DMB service, a satellite DMB mobile terminal for receiving broadcast signals from a satellite or a gap filter and providing the broadcast signals to a user in real time has been devised. The satellite DMB mobile terminal enables the user to appreciate a broadcast having a high sound quality and a high picture quality, such as the quality of a digital video disc (DVD), even while the user moves. Thus, the satellite DMB mobile terminal has recently been spotlighted in the mobile terminal market.

However, related art satellite DMB mobile terminals provide only basic functions such as a receiving function, a recording function, a reproducing function, and the like. Moreover, the related art satellite DMB mobile terminals do not provide a user-friendly extension function such as a function for inserting a user's voice or other sound effect into a received broadcast signal by the user.

SUMMARY OF THE INVENTION

The present invention is directed to editing a satellite broadcast signal in a mobile terminal of a wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a broadcast editing apparatus for editing a satellite broadcast signal in a mobile terminal of a wireless communication system, the apparatus comprising a demodulating unit for demodulating a satellite broadcast signal received through an antenna, a storing unit for storing a demodulated satellite broadcast signal, a video signal restoring unit for restoring a video signal separated from the satellite broadcast signal into an original video signal, an audio signal restoring unit for restoring an audio signal separated from the satellite broadcast signal into an original audio signal, an audio signal compressing unit for compressing an input signal, and a controller for separating the satellite broadcasting signal into the video signal and the audio signal, and multiplexing the separated video signal and the input signal compressed by the audio signal compressing unit.

Preferably, the input signal is at least one of a user's voice and a sound effect. The mobile terminal is a digital multimedia broadcast (DMB) mobile terminal.

In one aspect of the invention, the controller multiplexes the separated video signal and the input signal inputted through an audio signal inputting unit and compressed by the audio signal compressing unit, and then stores the multiplexed signal into the storing unit when a recording function is set.

In another aspect of the invention, the controller stores the video signal and not an audio signal of a corresponding section in the storing unit when a muting function is set during the recording function.

In a further aspect of the invention, the controller integrates the audio signal separated from the satellite broadcast signal with the input signal compressed by the audio signal compressing unit when a dubbing function is set, and then multiplexes the integrated audio signal and the video signal separated from the satellite broadcast signal to store the multiplexed signal in the storing unit.

Preferably, the demodulating unit is operated with a modulating unit as one modem.

In another embodiment of the present invention, a broadcast editing method for editing a satellite broadcast signal in a mobile terminal of a wireless communication system comprises separating a stored satellite broadcast signal into a video signal and an audio signal, respectively restoring the separated signals into an original video signal and an original audio signal, compressing an external audio signal when a recording function is set, multiplexing the video signal separated from the satellite broadcast signal and the compressed audio signal, and storing the multiplexed signal as one multimedia data.

Preferably, the stored multimedia data is selectively reproduced by a user. Also, the stored multimedia data is selectively transmitted by a user through a multimedia message service. Furthermore, the stored multimedia data is selectively re-edited by a recording function set by a user. Additionally, the stored multimedia data is selectively re-edited by a dubbing function set by a user.

In one aspect of the invention, the method further comprises removing an audio signal of a corresponding section when a muting function is set during the recording function.

Preferably, the external audio signal is at least one of a user' voice and a sound effect.

In another embodiment of the present invention, a broadcast editing method for editing a satellite broadcast signal in a mobile terminal of a wireless communication system comprises separating a stored satellite broadcast signal into a video signal and an audio signal, respectively restoring the separated signals into an original video signal and an original audio signal, compressing an external audio signal when a dubbing function is set, integrating the audio signal separated from the satellite broadcast signal with the compressed audio signal, multiplexing the integrated audio signal and the video signal separated from the satellite broadcast signal, and storing the multiplexed signal as one multimedia data.

Preferably, the stored multimedia data is selectively reproduced by a user. Also, the stored multimedia data is selectively transmitted by a user through a multimedia message service. Furthermore, the stored multimedia data is selectively re-edited by a recording function set by a user. Additionally, the stored multimedia data is selectively re-edited by a dubbing function set by a user.

Preferably, the external audio signal is at least one of a user' voice and a sound effect.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a broadcast editing apparatus and method capable of editing a satellite broadcast signal in a mobile terminal of a wireless communication system. Reference will now be made in detail to the preferred embodiments of the present invention, examples of which are illustrated in the accompanying drawings.

Figure 1:
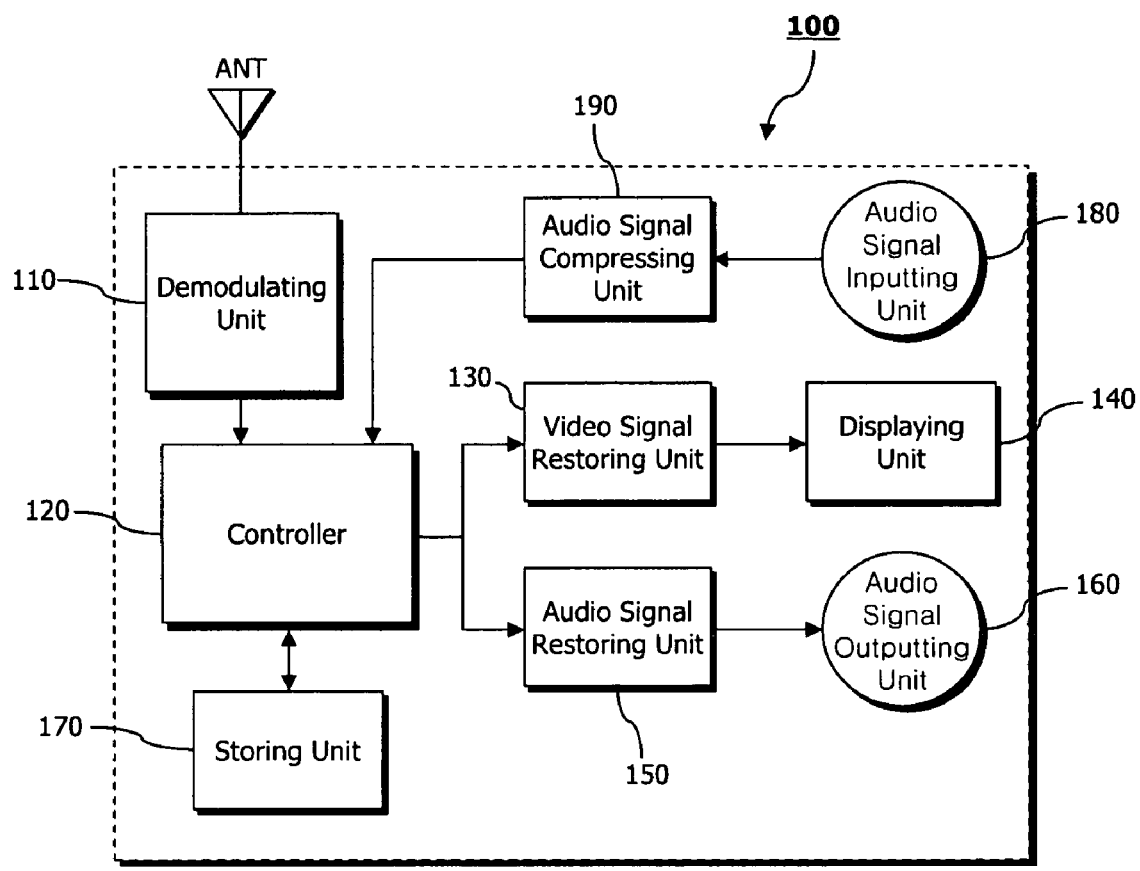
FIG. 1 illustrates a construction of a broadcasting editing apparatus in accordance with one embodiment of the present invention.

FIG. 1 illustrates a construction of a broadcast editing apparatus of a satellite DMB mobile terminal in accordance with one embodiment of the present invention. As shown in FIG. 1, the broadcast editing apparatus 100 comprises a demodulating unit 110 for demodulating a satellite broadcast signal received through an antenna, a storing unit 170 for storing a demodulated satellite broadcast signal, a video signal restoring unit 130 for restoring a video signal separated from the satellite broadcast signal into an original video signal, an audio signal restoring unit 150 for restoring an audio signal separated from the satellite broadcast signal into an original audio signal, an audio signal compressing unit 190 for compressing an input signal, such as a user's voice or sound effect, and a controller 120 for separating the satellite broadcast signal into the video signal and the audio signal, and for multiplexing the separated video signal and the input signal compressed by the audio signal compressing unit 190.

The demodulating unit 110 may be a modem constructed with a modulating unit (not shown), and demodulates, via the controller 120, a satellite broadcast signal received from a satellite or a gap filter through an antenna when a broadcast watching function or a recording function is set by a user.

The storing unit 170 may be a flash memory having a large capacity. The storing unit 170 may, via the controller 120, temporarily store the satellite broadcast signal for reproducing the satellite broadcast in real time, or may store the satellite broadcast signal for a length of time until the broadcast signal is deleted by the user for implementing a recording function.

The video signal restoring unit 130 restores the video signal separated from the satellite broadcast signal into an original video signal, and via the controller 120, displays the restored video signal on a display unit 240 such as a liquid crystal display (LCD).

The audio signal restoring unit 150 restores the audio signal separated from the satellite broadcasting signal into an original audio signal, and via the controller 120, outputs the restored audio signal to an audio signal outputting unit 160 such as a speaker.

The audio signal compressing unit 190 compresses a user's voice or sound effect inputted through an audio signal inputting unit 180 such as a microphone. The audio signal inputted may be compressed by at least one of various commercialized compression methods. Preferably, the compression methods utilized by the present invention include audio signal compression methods, such as an enhanced variable rate coding (EVRC) mainly applied to a mobile terminal, an advanced audio coding (AAC) mainly applied to a satellite DMB, and the like.

If a broadcast recording function is set by the user, the controller 120 stores the demodulated satellite broadcast signal in the storing unit 170. If a broadcast watching function or a broadcast reproducing function is set by the user, the controller 120 divides the satellite broadcast signal demodulated by the demodulating unit 110 or the satellite broadcast signal stored in the storing unit 170 into a video signal and an audio signal, and respectively transmits the divided signals to the video signal restoring unit 130 and the audio signal restoring unit 150. If a recording function is set by the user, the controller 120 multiplexes the separated video signal and the audio signal inputted through the audio signal inputting unit 180 and compressed by the audio signal compressing unit 190, and then stores the multiplexed signal into the storing unit 170.

If a dubbing function is set by the user, the controller 120 integrates the separated audio signal with the audio signal compressed by the audio signal compressing unit 190, and then multiplexes the integrated audio signal and the separated video signal to store the multiplexed signal in the storing unit 170.

The operation of the broadcast editing apparatus 100 will be explained as follows. The demodulating unit 110 demodulates a received satellite broadcast signal when a broadcast watching function is set by the user. The controller 120 then divides the demodulated satellite broadcast signal into a video signal and an audio signal.

The separated video signal and audio signal are respectively inputted into the video signal restoring unit 130 and the audio signal restoring unit 150, thereby being restored into an original video signal and an original audio signal. The restored video signal and audio signal are respectively outputted to the displaying unit 140 and the audio signal outputting unit 160 as video and audio data.

If a broadcast recording function is set by the user, the controller 120 stores the satellite broadcast signal demodulated by the demodulating unit 110 into the storing unit 170.

If a broadcast reproducing function is set by the user, the controller 120 reads the satellite broadcast signal from the storing unit 170 to divide the signal into a video signal and an audio signal. The controller 120 then respectively transmits the separated video signal and audio signal to the video signal restoring unit 130 and the audio signal restoring unit 150, thereby displaying video data on the displaying unit 140 and outputting audio data corresponding to the video data to the audio signal outputting unit 160.

While the broadcast reproduction is performed, if the user operates a recording function, the controller 120 multiplexes the video signal separated from the satellite broadcast signal and the audio signal inputted into the audio signal inputting unit 180 to be compressed by the audio signal compressing unit 190, and then stores the multiplexed signal in the storing unit 170.

While the recording function is performed, if a muting function is set by the user, the controller 120 divides the satellite broadcast signal into a video signal and an audio signal. Then, the controller 120 transmits only the video signal to the video signal restoring unit 130 without transmitting the audio signal to the audio signal restoring unit 150. Accordingly, only video data restored by the video signal restoring unit 130 is displayed on the displaying unit 140, and audio data corresponding to the video data is not outputted to the audio signal outputting unit 160.

While the broadcast reproduction is performed, if the user operates a dubbing function, the controller 120 integrates the separated audio signal with the audio signal compressed by the audio signal compressing unit 190. Then, the controller 120 multiplexes the integrated audio signal and the separated video signal to store the multiplexed signal in the storing unit 170.

Figure 2:
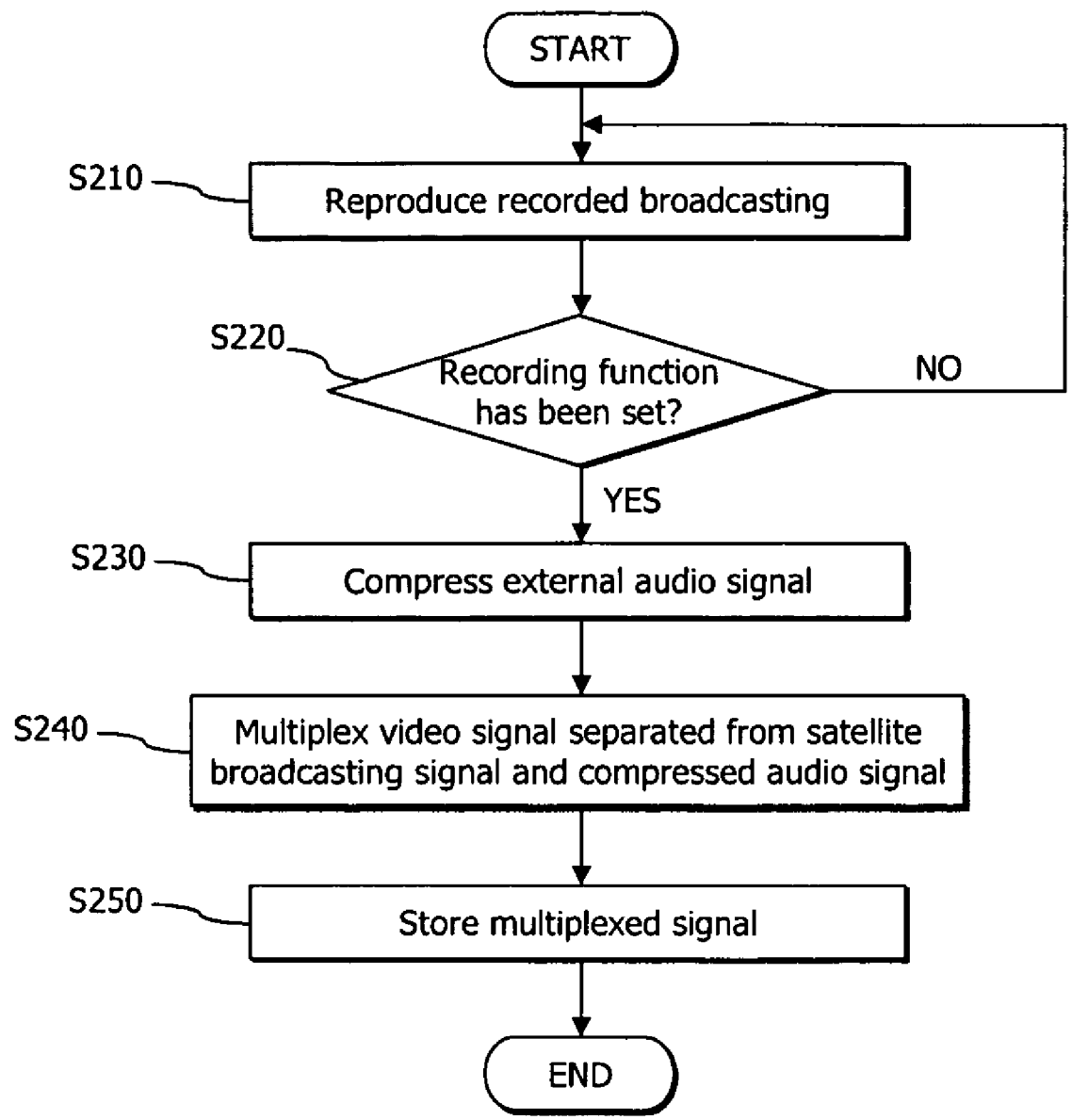
FIG. 2 is a flowchart illustrating a broadcasting editing method in accordance with one embodiment of the present invention.

FIG. 2 is a flowchart illustrating a broadcast editing method of a mobile terminal in accordance with one embodiment of the present invention. Specifically, the figure illustrates a method for recording an external audio signal into a satellite broadcast.

Referring to FIG. 2, when a broadcast reproducing function is set by the user, a recorded satellite broadcast is reproduced (S210). That is, a stored satellite broadcast signal is divided into a video signal and an audio signal, and the separated signals are respectively restored into an original video signal and an original audio signal to be outputted.

While the broadcast is reproduced, the mobile terminal certifies whether an audio signal recording function is set by the user (S220). If so, an external audio signal is compressed (S230). When the compression process is completed, the video signal separated from the satellite broadcast signal and the compressed audio signal are multiplexed (S240). The multiplexed signal is then stored in a storing unit, such as a memory, as multimedia data (S250).

Figure 3:
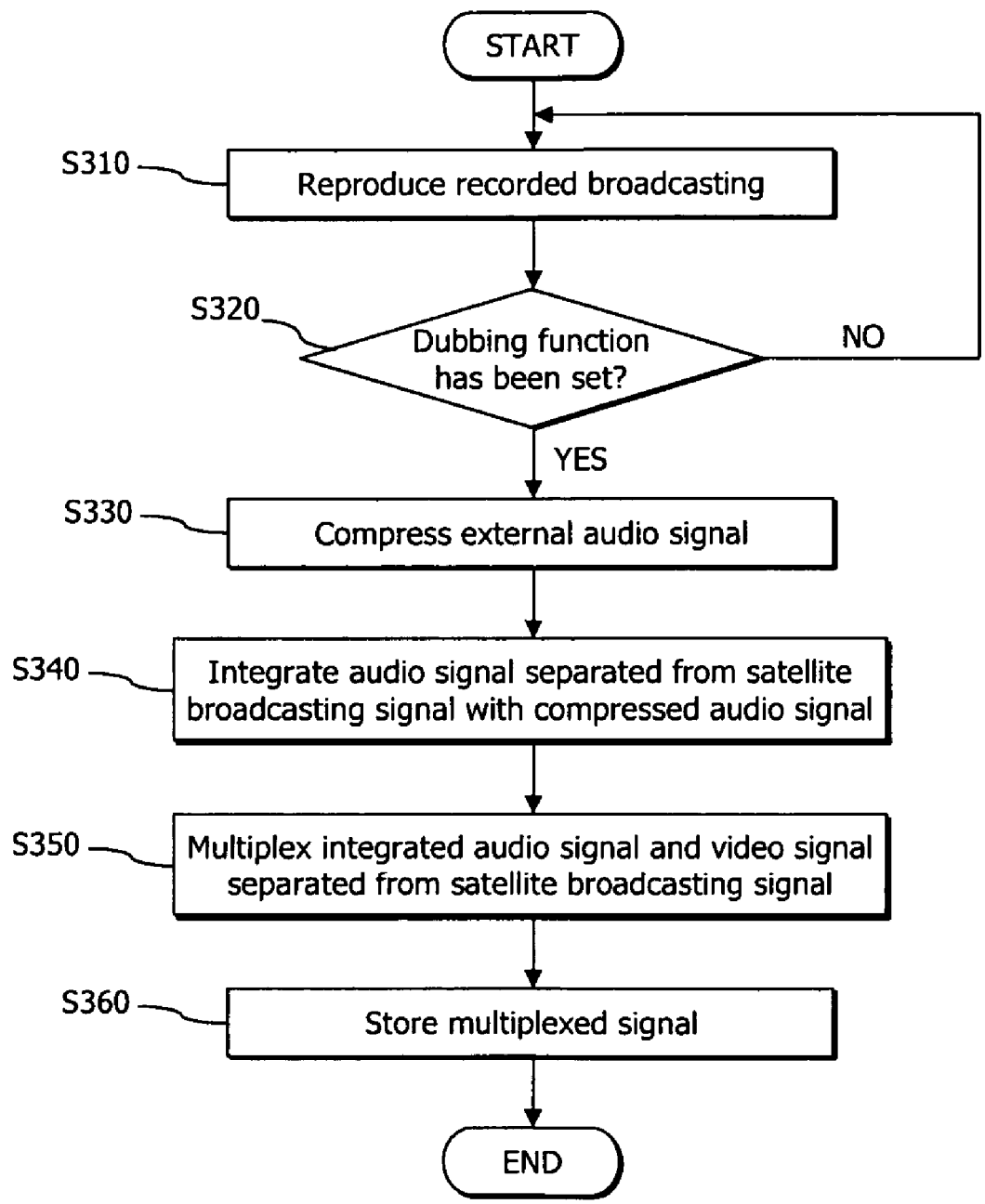
FIG. 3 is a flowchart illustrating a broadcasting editing method in accordance with another embodiment of the present invention.

FIG. 3 is a flowchart illustrating a broadcast editing method of a mobile terminal in accordance with another embodiment of the present invention. Specifically, the figure illustrates a method for dubbing an external audio signal into a satellite broadcast.

Referring to FIG. 3, when a broadcast reproducing function is set by the user, a recorded satellite broadcast is reproduced (S310). That is, a stored satellite broadcast signal is divided into a video signal and an audio signal, and the separated signals are respectively restored into an original video signal and an original audio signal to be outputted.

While the broadcast is reproduced, the mobile terminal certifies whether a dubbing function is set by the user (S320). If so, an external audio signal is compressed (S330). When the compression process is completed, the audio signal separated from the satellite broadcast signal and the compressed audio signal are integrated (S340). After, the integrated audio signal is multiplexed with the video signal separated from the satellite broadcast signal (S350). The multiplexed signal is then stored in a storing unit, such as a memory, as multimedia data (S360).

In accordance with the present invention, the stored multiplexed multimedia data may be reproduced whenever the user desires, transmitted to another mobile terminal or a web page by a multimedia message service (MMS), and stored in a computer or another storing unit through a cable. For example, the user may insert his voice into a film received from a satellite broadcast by using a mobile terminal instead of the original audio signal. Further, the user may add his explanation to a part of the film where sound is generated as a dubbing function. The user may also store the film edited by himself in the mobile terminal or transmit the film to his acquaintances.

The multimedia data may be re-edited several times by the user using the audio recording function and the dubbing function. A recorded broadcast may be canceled by an edit function before being stored, thereby being re-edited.

As aforementioned, in the broadcast editing apparatus of a mobile terminal and the method thereof, a video signal is separated from a satellite broadcast signal received from a satellite or a gap filter. The separated video signal is integrated with an inputted user's voice or sound effect, thereby editing a satellite broadcast. The edited satellite broadcast is stored and reproduced whenever the user desires. Accordingly, the user may edit and appreciate the satellite broadcast according to his preference.

Also, in the present invention, an audio signal may be transmitted to another party through an MMS by being inserted into a satellite broadcast.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for re-configuring a broadcast signal in a digital multimedia broadcast mobile terminal of a wireless communication system, the apparatus comprising:
   a storage unit for storing a received broadcast signal;
   a controller for separating the received broadcast signal into a video signal and an audio signal;
   a video signal restoring unit for restoring the video signal separated from the received broadcast signal; and
   an audio signal compressing unit for compressing an input audio signal input by a user,
   wherein the controller further creates a multiplexed signal by multiplexing only the video signal separated by the controller and the input audio signal compressed by the audio signal compressing unit if an audio signal recording function has been set by the user, stores the multiplexed signal in the storage unit, and transmits the multiplexed signal stored in the storage unit via a multimedia message service according to a user input, and
   wherein a source of the input audio signal is different from a source of the audio signal separated by the controller.

2. The apparatus of claim 1, wherein the input audio signal is at least a user's voice or a sound effect.

3. The apparatus of claim 1, wherein the controller stores the video signal separated by the controller in the storing unit only when a muting function is set during the audio signal recording function.

4. A method for re-configuring a broadcast signal in a digital multimedia broadcast mobile terminal of a wireless communication system, the method comprising:
   separating the broadcast signal into a video signal and an audio signal;
   restoring the video signal separated from the broadcast signal;
   compressing an audio signal input by a user; and
   creating a multiplexed signal by multiplexing only the separated video signal and a compressed input audio signal if an audio signal recording function has been set by the user, wherein a source of the input audio signal and the separated audio signal are different;
   storing the multiplexed signal as multimedia data; and
   transmitting the stored multimedia data via a multimedia message service according to a user input.

5. The method of claim 4, wherein the stored multimedia data is selectively reproduced by the user.

6. The method of claim 4, wherein the stored multimedia data is selectively re-edited by a recording function set by the user.

7. The method of claim 4, wherein the stored multimedia data is selectively re-edited by a dubbing function set by the user.

8. The method of claim 4, further comprising removing an audio signal of a corresponding section when a muting function is set during the audio signal recording function.

9. The method of claim 4, wherein the input audio signal is at least a user's voice or a sound effect.

* * * * *